United States Patent [19]

Oshita et al.

[11] Patent Number: 4,800,975
[45] Date of Patent: Jan. 31, 1989

[54] MOTOR CONTROL UNIT FOR ELECTRICALLY OPERATED POWER STEERING DEVICES

[75] Inventors: Saiichiro Oshita; Toyohiko Mouri; Yuji Uemura, all of Ohta, Japan

[73] Assignee: Fuji Jukogyo Kabushiki Kaisha, Tokyo, Japan

[21] Appl. No.: 99,689

[22] Filed: Sep. 18, 1987

Related U.S. Application Data

[63] Continuation of Ser. No. 785,929, Oct. 9, 1985, abandoned.

[30] Foreign Application Priority Data

Oct. 19, 1984 [JP] Japan .................................. 59-220956

[51] Int. Cl.$^4$ ................................................ B62D 5/04
[52] U.S. Cl. .................................. 180/142; 180/79.1; 364/424.05
[58] Field of Search ...................... 180/79.1, 141, 142, 180/143, 147, 148; 74/388 PS; 364/424

[56] References Cited

U.S. PATENT DOCUMENTS

| 4,556,116 | 12/1985 | O'Neil | 180/142 |
| 4,573,545 | 3/1986 | Kalns | 180/79.1 |
| 4,577,715 | 3/1986 | Saito | 180/143 |

FOREIGN PATENT DOCUMENTS

| 76760 | 6/1980 | Japan | 180/79.1 |
| 8467 | 1/1983 | Japan | 180/79.1 |

Primary Examiner—David M. Mitchell
Assistant Examiner—Everett G. Diederiks, Jr.
Attorney, Agent, or Firm—Martin A. Farber

[57] ABSTRACT

An electrically operated power steering device connected to a steering system of a motor vehicle to provide supplementary steering power by means of an electric motor. A motor control unit for the electrically operated power steering device controls the rotational direction and output torque of the electric motor by the sum of an assistance signal based on the signal from a torsional torque sensor and a velocity sensor in the steering system, a restoration signal based on the output signal from a steering angle sensor, and an auxiliary assistance signal based on the output signal from the torsional torque sensor in the steering system as a command signal.

16 Claims, 4 Drawing Sheets

MOTOR CONTROL UNIT FOR ELECTRICALLY OPERATED POWER STEERING DEVICES

BACKGROUND OF THE INVENTION

Related Application

This application is a continuation of our co-pending application Ser. No. 785,929, filed Oct. 9, 1985, now abandoned.

The present invention concerns a motor control unit for electrically operated power steering devices which provide supplementary steering power to vehicle steering systems by driving an electric motor.

Previously, there has been known, from the Japanese publication of examined patent application (JB, B1) No. 45-41246 (1970), a motor control unit for electrically operated power steering devices, in which a torsional torque sensor is provided to measure the torsional torque of the steering shaft on completion of a turn, the rotational direction and output torque of the electric motor being controlled according to the output signal from said torsional torque sensor.

In electrically operated power steering devices such as mentioned above, since there exist reduction gears in the transmission from motor to the steering mechanism, the restoring action of the steering wheel on completion of a turn tends to reduce due to friction in the reduction gears and inertia of the electric motor. The increased motor inertia also results in a delay motor response to the steering input, and consequently in the feel of the steering. If the power steering device is designed to provide sufficient supplementary steering power (power assistance) at low speeds, the assistance would become excessive at high speeds, making the steering wheel feel light and insecure. Also, since there occurs a time lag between the steering input and generation of the power assistance due to a signal phase lag in the motor control circuit between the torsional torque sensor and the electric motor, the control system is sensitive to disturbances, and prone to self-excited vibration when steering while the vehicle is at a standstill.

SUMMARY OF THE INVENTION

It is an object of the present invention to provide a motor control unit for electrically operated power steering devices, which has improved steering wheel restoration characteristics on completion of a turn, has improved motor response to steering input, avoids excessive power assistance at high speeds, and prevents self-excited vibrations when steering at a standstill.

To meet the objectives mentioned above, according to the present invention, an electrically operated power steering device in which the rotational direction and output torque of the electric motor are controlled by a command signal based on the output signal from a torsional torque sensor which measures the torsional torque in the steering system, is further provided with a velocity sensor to measure the vehicle speed and a steering angle sensor to measure the angular displacement of the wheel. Also provided are: an assistance command unit which produces an assistance signal which, based on the output signals from said torsional torque sensor and velocity sensor, increases in absolute value with increasing torsional torque and decreases in absolute value with increasing vehicle speed; a restoration command unit which produces a restoration signal based on the output from said steering angle sensor; and a phase compensation command unit which immediately sends out an auxiliary assistance signal corresponding to the rate of change of output from said torsional torque sensor. The rotational direction and output torque of the electric motor is controlled by the sum of said assistance, restoration and auxiliary assistance signals as the command signal.

Provided such means, the command signal controlling the rotational direction and output torque of the electric motor for power assistance, diminishes in magnitude as the vehicle speed increases, and assumes a value causing the electric motor to generate an output torque tending to return the wheel toward neutral position when the input steering force is reduced and the absolute value of the torsional torque falls below a value which depends on the steering angle. The motor starts up simultaneously with steering input, as the auxiliary assistance signal acts as the command signal.

DETAILED DESCRIPTION OF THE PREFERRED EMBODIMENT

An embodiment of the present invention shall now be described by making reference to the attached drawings.

Figure 1:
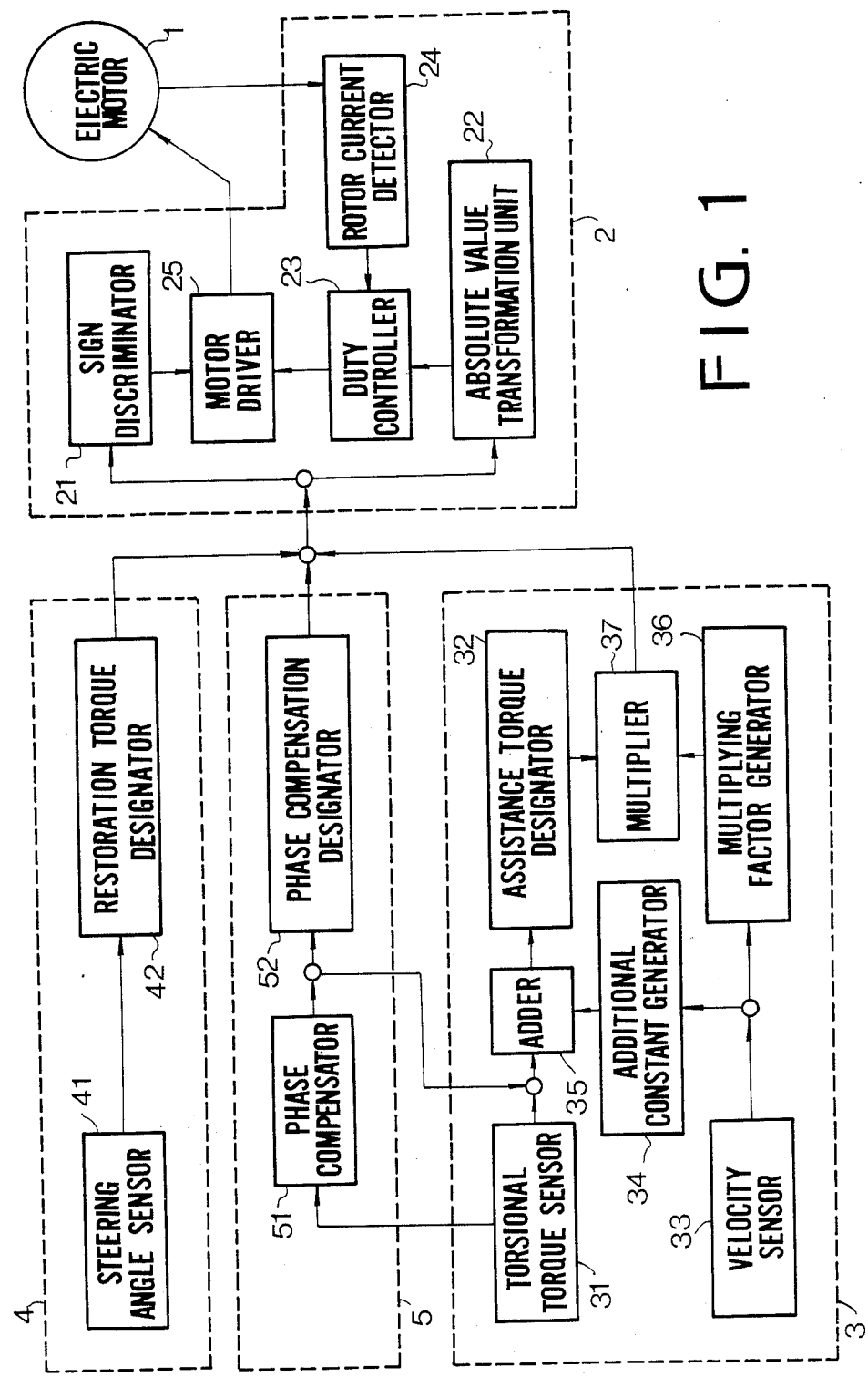
FIG. 1 is a block diagram showing the components of an embodiment of the present invention.

In FIG. 1, electric motor for providing power assistance, which supplies power assistance to the steering system through an unshown rack-pinion mechanism to which it is connected by reduction gears and joints, is indicated by reference number 1. The rotational direction and output torque of this motor is controlled based on a control signal by a drive control unit 2 which includes a sign discriminator 21, an absolute value transformation unit 22, a duty ratio controller 23, a rotor current detector 24 and a motor driver 25. The control signal is fed to the sign discriminator 21 and to the absolute value transformation unit 22, the output from the sign discriminator 21 in turn being fed to the motor driver 25 to switch the direction of motor current according to the sign of the control signal, and the output from the absolute value transformation unit 22 being fed to the duty ratio controller 23 to determine the duty ratio which in turn is fed to the motor driver 25 to generate an output torque in accordance with the magnitude of the control signal. The output torque of the electric motor 1 is controlled so as to converge toward the required value by measuring the rotor current in the motor 1 with the rotor current detector 24 and feeding the measured value back to the duty ratio controller 23.

According to the present invention, the control signal for the drive control unit 2 is supplied by an assistance command unit 3, a restoration command unit 4 and a phase compensation command unit 5.

Figure 2:
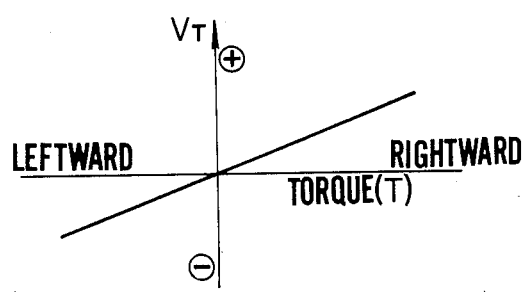
FIG. 2 is a graph showing the output characteristic of the torsional torque sensor.
Figure 3:
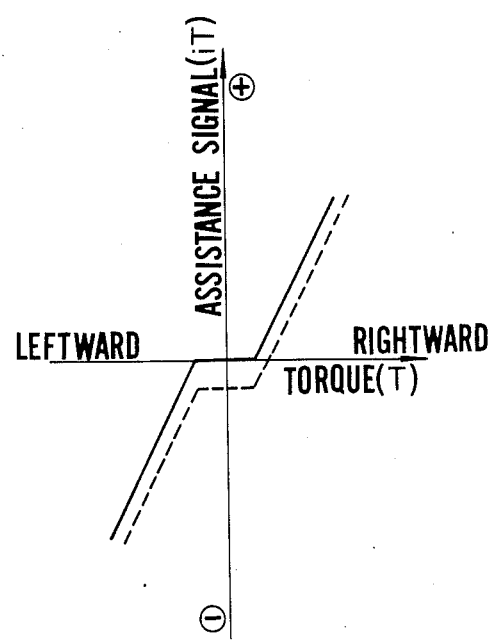
FIG. 3 shows the basic characteristic of the assistance signal iT.
Figure 4:
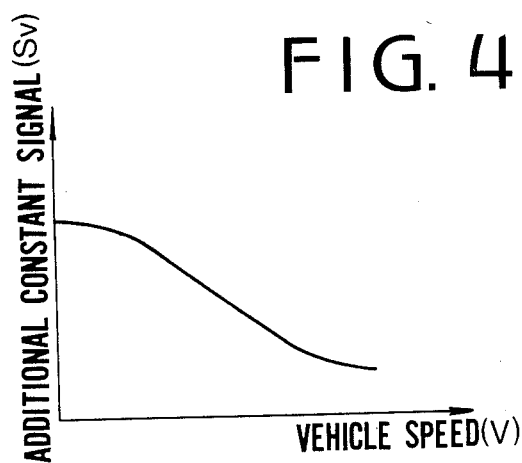
FIG. 4 shows the characteristic of the additional constant signal Sv.
Figure 5:
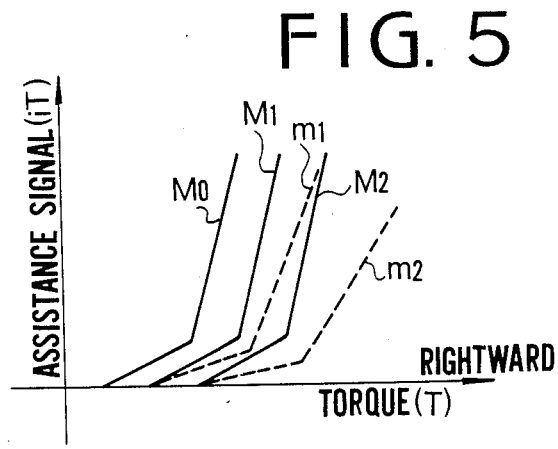
FIG. 5 shows how the assistance signal characteristic varies with speed.
Figure 6:
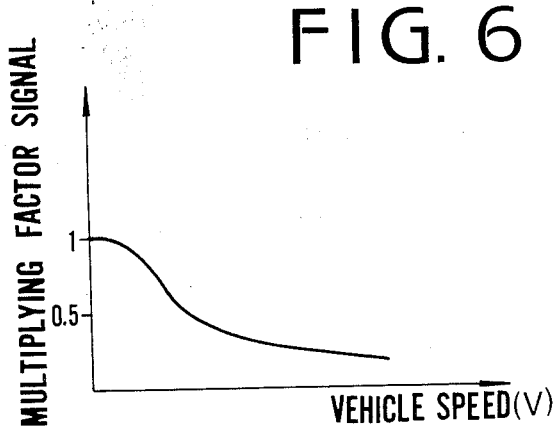
FIG. 6 shows the characteristic of the multiplying factor signal.

The assistance command unit 3 basically generates an assistance signal corresponding to the magnitude and direction of the torsional torque in the steering system. It consists of a torsional torque sensor 31 connected to an unshown steering shaft to measure the direction and magnitude of the torsional torque being applied, and an assistance torque designator 32 which generates an assistance signal iT of characteristic as shown in FIG. 3, in response to the output signal from the torsional torque sensor 31 whose characteristic is as shown in FIG. 2. The characteristic of the assistance torque designator 32 is such that no output occurs while the magnitude of applied torque is below a certain level, the magnitude and sign of the output changing in accordance with the magnitude and direction of applied torque when this value is exceeded. Also provided in the assistance command unit are, a velocity sensor 33 which measures the vehicle speed, an additional constant generator 34 which, based on the output from the velocity sensor 33, generates an additional constant signal Sv of characteristic as shown in FIG. 4 which decreases in magnitude with increasing vehicle speed, and an adder 35 which accepts said additional constant signal Sv and the output of the torsional torque sensor 31 as input and which sends its output to the assistance torque designator 32. The additional constant signal Sv is either added to or subtracted from the output of torsional torque sensor 31 depending on the sign of the latter, to shift the characteristic curve shown in FIG. 3 to the left or to the right, with vehicle speed as a parameter. In other words, the output signal from the assistance torque designator 32 decreases in absolute value as vehicle speed increases under a given input torque, and increases in absolute value with an increase in absolute value of input torque under a given speed. (See FIG. 5.) Further, a multiplying factor generator 36 and a multiplier 37 are provided in the assistance command unit, to modify this output as shown by the broken lines in FIG. 5 according to vehicle speed. On the basis of the output from the velocity sensor 33, the multiplying factor generator 36 generates a multiplier signal of characteristic as shown in FIG. 6, which takes the value 1 at zero vehicle speed and asymptotically approachses 0 with increasing vehicle speed. The multiplier 37 multiplies the output from the assistance torque designator 32 by the multiplying factor, so that the assistance signal from the multiplier 37 would take the form shown by the broken lines in FIG. 5, according to speed.

Figure 7:
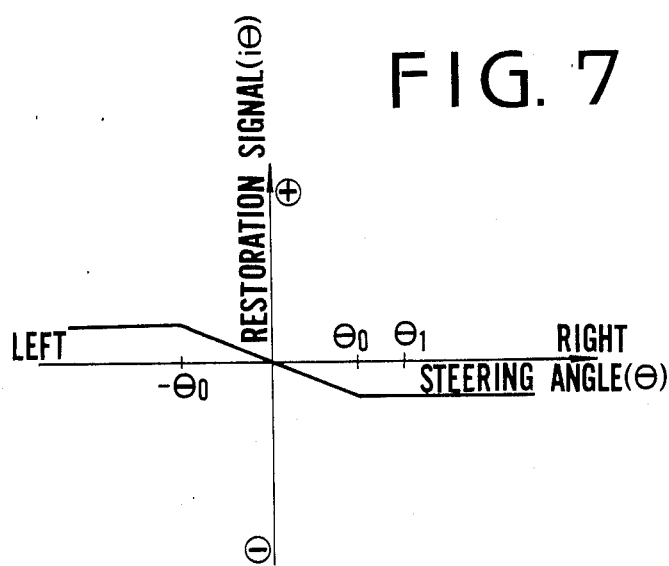
FIG. 7 shows the characteristic of the restoration signal i $\theta$.

The restoration command unit 4 generates a signal according to the angular displacement of the wheel to cause the steering wheel to return to neutral position. It comprises a steering angle sensor 41, which measures the angular displacement of the wheel in terms of the lateral displacement of the rack in an unshown rack-pinion mechanism, and a restoration torque designator 42 which generates a restoration (return torque) signal $i\theta$ of charactertistic as shown in FIG. 7 based on the output from said steering angle sensor 41.

Figure 8:
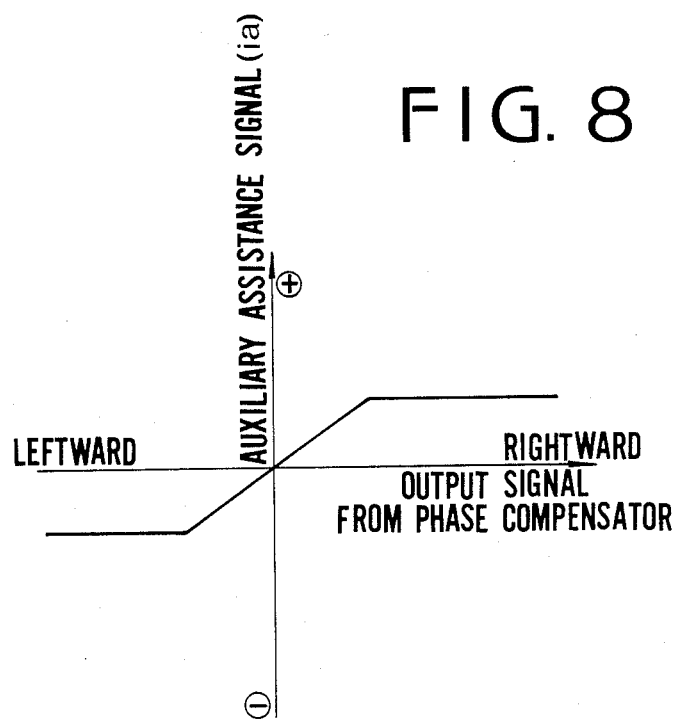
FIG. 8 shows the characteristic of the auxiliary assistance signal ia.

The phase compensation command unit 5 consists of a phase compensator 51 which accepts the output signal from the torsional torque sensor 31 to produce an output proportional to its rate of change with respect to time, and a phase compensation designator 52 which produces an auxiliary assistance signal ia of characteristic as shown in FIG. 8 for example, based on the output signal from the phase compensator 51. In the embodiment described, the output signal from the phase compensator 51 is also added to the output from the torsional torque sensor 31 to be fed to the adder 35.

The assistance signal iT from the assistance command unit 3, the restoration signal $i\theta$ from the restoration command unit 4 and the auxiliary assistance signal ia from the phase compensation command unit 5 are summed and fed to the drive control unit 2 as command signals.

Due to such construction, when a torsional torque occurs in the steering system by operation of the steering wheel, the torsional torque sensor 31 detects this torque and produces an output signal, upon which an assistance signal is generated by the assistance command unit 3, to control the rotational direction and output torque of the electric motor 1 through sign discriminator 21 and duty ratio controller 23 according to the absolute value of the assistance signal iT. The relationship between the torsional torque and the assistance signal iT is basically as shown in FIG. 3. For example, in response to a rightward steering input torque, a positive assistance signal is generated, which increases in magnitude with an increase in torque. Thus, the electric motor 1 produces an output torque of magnitude corresponding to the applied input torque in the direction that assists rightward steering to relieve the steering load on the operator of the vehicle. In the case of a leftward turn the electric motor 1 is controlled to assist leftward steering under a negative assistance signal, to act similarly as in the case of rightward steering.

According to the present invention, the functional relationship between the torsional torque and the assistance signal is varied by the output from the velocity sensor 33. For example, in FIG. 5 which shows the characteristics of the assistance signal in response to rightward steering input torque, where the condition at zero speed is indicated by $M_o$, the characteristic curves shift along the X axis to the right to $M_1$ and $M_2$ as vehicle speed increases to $V_1$ and $V_2$ due to the addition of the additional constant, and the slopes of the curves are reduced from $M_1$ to $m_1$ and from $M_2$ to $m_2$ due to multiplication by the multiplying factor. Hence, under given input torque, the magnitude of the assistance signal decreases with the increase in vehicle speed. In other words, the output torque from the electric motor 1 decreases with an increase in speed, so that excessive power assistance is avoided at high speeds while providing sufficient power assistance at a standstill or at low speeds, thus providing positive feel to the steering system.

Meanwhile, the steering angle sensor 41 detects the angular displacement of the wheel following a steering input, and based on this signal, the restoration command unit 4 produces a restoration signal $i\theta$ of characteristic as shown in FIG. 7, which is proportional to the steering angle for steering angles within $\pm\theta_O$ from neutral position, and constant for steering angles exceeding $\theta_0$ in magnitude, the signal being negative for region of rightward steering angle and positive for region of leftward steering angle. Thus for example, when the right steering angle $\theta_1$ is maintained, the electric motor 1 is controlled by the sum of the positive assistance signal iT based on the positive output from the torsional torque sensor 31 as mentioned before, and the negative restoration signal $i\theta_1$ based on the output from the steering angle sensor 41. In FIG. 3 where the assistance signal iT is indicated by the solid line, the sum of the signals mentioned above would become as indicated by the broken line. Therefore, if the maintenance of the right steering angle $\theta_1$ is released, the sum of signals would immediately take a negative (leftward) value along the broken line due to the rapid decrease in torsional torque T. Thus, a leftward steering torsional torque would occur at the electric motor 1, to overcome friction in the reduction gears and the motor's moment of inertia. Hence the restorating action of the steering wheel is improved, so that the steering system returns smoothly to neutral position under a caster effect while the vehicle is in motion. As the restoration signal $i\theta$ diminishes in magnitude toward zero with decrease in steering angle $\theta$, the output torque of the electric motor 1 would totally vanish at or near the neutral position, thus improving convergence in hands-off condition at high speeds.

The steering operation while the vehicle is at a standstill shall now be described. In this case, due to the existence of large resistance, the torsional torque would build up rapidly following a steering input, leading to a rapid increase proportional to torsional torque in output from the torsional torque sensor 31. The rapid increase in torsional torque is detected by the phase compensator 51 of the phase compensation command unit 5, resulting in an output signal corresponding to the rate of change in torsional torque being added to the output signal from the torsional torque sensor 31. Therefore, even in the very early stages of a steering operation when the torsional torque T has not yet built up to a value large enough to produce an assistance signal iT, the assistance signal iT would nevertheless be outputted immediately if the rate of increase in torsional torque is large enough, so that the electric motor 1 would respond without delay upon exertion of a steering force at a standstill, thus preventing occurrence of self-excited vibration.

The auxiliary assistance signal ia, of characteristic as shown in FIG. 8, is produced by the phase compensation designator 52 based on the output from the phase compensator 51. The auxiliary assistance signal is proportional to the rate of change with respect to time of torsional torque up to a certain magnitude, above which it takes constant values. Hence, in cases such as repeated hard steering alternately to left and right, the auxiliary assistance signal ia is generated immediately to absorb the motor inertia, and to improve the feel of steering.

Although the additional constant generator 34 has been selected to produce an additional constant signal which decreases with increasing speed in the embodiment described above, it may also be selected to produce an additional constant signal which increases with speed, in which case the additional constant signal would be subtracted from the output of the torsional torque sensor 31 at the adder 35.

In this respect the term "sum" in the claims also generically includes subtraction.

It is also possible for reduction in assistance signal without increasing speed to be made with either the additional constant generator 34 or the multiplying factor generator 36 of the assistance command unit 3.

As described above, according to the present invention, application of excessive steering power at high speeds, which cause lightness of the steering wheel and sense of insecurity, is avoided, since the command signal which controls the rotational direction and output torque of the electric motor for power assistance, decreases in magnitude with increasing speed. The restoring action of the steering wheel is also improved, because the command signal takes a value causing the motor to rotate in the restoring direction when the torsional torque falls below a predetermined value which varies with the angular displacement of the wheel. Furthermore, the response of power assistance is improved due to the occurrence of an auxiliary assistance signal immediately upon applying a steering input, preventing self-excited vibration when steering while the vehicle is at a standstill, and also absorbing the motor inertia on repeated steering in both directions to improve the feel of steering.

What is claimed is:

1. An electric power steering system for a motor vehicle having a motor operatively connected to a steering system for reducing steering effort, comprising:
   means comprising a torsion torque sensor for detecting torsion torque applied to the steering system in a steering operation for producing a torsion torque signal;
   means comprising a vehicle speed sensor for producing a vehicle speed signal;
   first means responsive to the torsion torque signal and to the vehicle speed signal for producing an assist torque signal the absolute value of which increases with increase of the absolute value of the torsion torque signal and decreases with increase of the vehicle speed signal;
   means comprising a steering angle sensor for detecting steering angle for producing a steering angle signal;
   second means responsive to the steering angle signal for producing a return torque signal independent of vehicle speed for returning the steering system to a neutral state;
   third means for adding the return torque signal to the assist signal; and
   fourth means responsive to summation of the assist torque signal and the return torque signal for producing a signal for driving the motor, whereby assist torque increases with increase of the absolute value of the torsion torque signal and decreases with increase of the vehicle speed signal, and returned torque is produced independent of the vehicle speed.

2. The system according to claim 1, further comprising
   means comprising a multiplying factor generator for generating a multiplying factor signal based on said vehicle speed signal, said multiplying factor signal diminishes in magnitude as the vehicle speed increases, and
   said means comprising said multiplying factor generator multiplies the assist torque signal by the multiplying factor signal.

3. The system according to claim 1, wherein
   said second means produces said return torque signal constant for absolute values of the steering angle greater than a predetermined value and as a proportional linear function of the steering angle for all other steering angles.

4. An electric power steering system for a motor vehicle having a motor operatively connected to a steering system for reducing steering effort, comprising:
   means comprising a torsion torque sensor for detecting torsion torque in the steering system in a steering operation for producing a torsion torque signal;
   means comprising a vehicle speed sensor for producing a vehicle speed signal;

first means responsive to the torsion torque signal and to the vehicle speed signal for producing an assist signal;

means comprising a steering angle sensor for detecting steering angle for producing a steering angle signal;

second means responsive to the steering angle signal for producing a return torque signal having reverse polarity of the assist signal;

third means for adding the return torque signal to the assist signal; and fourth means responsive to summation of the assist signal and the return torque signal for producing a signal for driving the motor;

means comprising an additional constant generator for generating an additional constant signal based on said vehicle speed signal, and wherein said first means includes an assistance torque designator receiving the sum of said torsional torque signal and said additional constant signal.

5. The system according to claim 4, wherein
said additional constant generator produces said additional constant signal decreasing with increasing vehicle speed.

6. An electric power steering system for a motor vehicle having a motor operatively connected to a steering system for reducing steering effort, comprising:

means comprising a torsion torque sensor for detecting torsion torque in the steering system in a steering operation for producing a torsion torque signal;

means comprising a vehicle speed sensor for producing a vehicle speed signal;

first means responsive to the torsion torque signal and to the vehicle speed signal for producing an assist signal;

means comprising a steering angle sensor for detecting steering angle for producing a steering angle signal;

second means responsive to the steering angle signal for producing a return torque signal having reverse polarity of the assist signal;

third means for adding the return torque signal to the assist signal; and fourth means responsive to summation of the assist signal and the return torque signal for producing a signal for driving the motor;

a phase compensation command means comprising means comprising a phase compensator for generating an output signal proportional to rate of change with respect to time of an output signal from said torsional torque sensor, and means comprising a phase compensation designator for producing an auxiliary assistance signal based on the output signal from said phase compensator.

7. The system according to claim 6, wherein
the output signal from said phase compensator is added to said torsion torque signal.

8. The system according to claim 7, wherein
said third means adds said auxiliary, assistance signal to said assist signal and said return torque signal.

9. The system according to claim 8, wherein
said first means produces said assist signal responsive to the vehicle speed signal and sum of said torsion torque signal and said output signal from said phase compensator.

10. The system according to claim 7, wherein
said first means produces said assist signal responsive to the vehicle speed signal and sum of said torsion torque signal and said output signal from said phase compensator.

11. The system according to claim 6, wherein
said auxiliary assistance signal is proportional to said rate up to a predetermined magnitude and has constant values above said predetermined magnitude.

12. The system according to claim 11, wherein
said third means adds said auxiliary assistance signal to said assist signal and said return torque signal.

13. The system according to claim 6, wherein
said third means adds said auxiliary assistance signal to said assist signal and said return torque signal.

14. An electric power steering system for a motor vehicle having a motor operatively connected to a steering system for reducing steering effort, comprising:

means comprising a torsion torque sensor for detecting torsion torque applied to the steering system in a steering operation for producing a torsion torque signal;

means comprising a vehicle speed sensor for producing a vehicle speed signal;

first means responsive to the torsion torque signal and to the vehicle speed signal for producing an assist torque signal the absolute value of which increases with increase of the absolute value of the torsion signal and decreases with increase of the vehicle speed signal;

means comprising a steering angle sensor for detecting steering angle for producing a steering angle signal;

second means responsive to the steering angle signal for producing a return torque signal for returning the steering system to a neutral state;

third means for adding the return torque signal to the assist signal; and fourth means responsive to summation of the assist torque signal and the return torque signal for producing a signal for driving the motor, whereby assist torque increasing with increase of the absolute value of the torsion torque signal and decreasing with increase of the vehicle speed signal is produced;

the first means comprising an additional constant generator for generating an additional constant signal based on said vehicle speed signal; and wherein an assistance torque designator receiving the sum of said torsional signal and said additional constant signal.

15. The system according to claim 14, wherein
said additional constant generator produces said additional constant signal decreasing with increasing vehicle speed.

16. In an electric power steering system having a steering wheel, a motor operatively connected to a steering system for reducing steering effort of turning the steering wheel, torsion torque sensing means for detecting torsion torque and direction of torsion applied on the steering wheel in a steering operation and producing ouput signals dependent thereon, vehicle speed sensor for producing an output signal comprising a vehicle speed signal dependent on vehicle speed, and assist command signal generating means for generating an assist signal to assist the turning of the steering wheel responsive to output signals of the torsion torque sensing means and vehicle speed sensor, the improvement comprising detecting means for detecting an operating condition of the steering wheel and providing an output signal, restoration torque designating means responsive to the output signal from the detecting means for calculating a restoration torque signal representative of a restoring torque, independent of vehicle speed, of a direction opposite to rotating directions clockwise and counterclockwise, respectively of the steering wheel, and summing means for summing the assist signal and the restoration torque signal and for producing a summing signal for actuating the motor, so that steering angle of the steering wheel converges at a center position between clockwise and counterclockwise limits of the steering angle when the steering wheel is released.

* * * * *